(12) United States Patent  
Sugiura et al.

(10) Patent No.: US 11,214,364 B2  
(45) Date of Patent: Jan. 4, 2022

(54) MAIN ROTOR BLADE AND HELICOPTER

(71) Applicant: JAPAN AEROSPACE EXPLORATION AGENCY, Tokyo (JP)

(72) Inventors: Masahiko Sugiura, Tokyo (JP); Yasutada Tanabe, Tokyo (JP); Noboru Kobiki, Tokyo (JP); Takashi Aoyama, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 89 days.

(21) Appl. No.: 16/608,403

(22) PCT Filed: Feb. 7, 2018

(86) PCT No.: PCT/JP2018/004264  
§ 371 (c)(1),  
(2) Date: Oct. 25, 2019

(87) PCT Pub. No.: WO2018/198477  
PCT Pub. Date: Nov. 1, 2018

(65) Prior Publication Data  
US 2021/0094681 A1   Apr. 1, 2021

(30) Foreign Application Priority Data  
Apr. 26, 2017   (JP) .............................. JP2017-086872

(51) Int. Cl.  
*B64C 27/46*   (2006.01)  
*B64C 27/04*   (2006.01)  
(Continued)

(52) U.S. Cl.  
CPC ............ *B64C 27/463* (2013.01); *B64C 27/04* (2013.01); *B64C 27/467* (2013.01);  
(Continued)

(58) Field of Classification Search  
None  
See application file for complete search history.

(56) References Cited

U.S. PATENT DOCUMENTS 1,692,081 A * 11/1928 De La Cierva ....... B64C 27/023  
                                                  416/131  
2,996,269 A    8/1961 Parry  
(Continued)

FOREIGN PATENT DOCUMENTS

EP   0866765 A1   9/1998  
EP   1893483 A2   3/2008  
(Continued)

OTHER PUBLICATIONS

International Search Report in International Application No. PCT/JP2018/004264, filed Feb. 7, 2018.  
(Continued)

*Primary Examiner* — Juan G Flores  
(74) *Attorney, Agent, or Firm* — Saliwanchik, Lloyd & Eisenschenk

(57) ABSTRACT

A main rotor blade 1, which is the main rotor blade 1 for a high-velocity helicopter, includes: a blade root part 10 having a length of 30% or more of a rotor radius R; and a blade main body 20 continuous with the blade root part 10. Preferably, a cross-sectional shape of the blade root part 10 satisfies $(x/a)^m + (y/b)^m = 1$ and a>b, where m: arbitrary number, x: chord length direction, and y: blade thickness direction.

12 Claims, 6 Drawing Sheets

(51) Int. Cl.
  *B64C 27/467* (2006.01)
  *B64C 27/473* (2006.01)
  *F01D 5/14* (2006.01)
  *F01D 5/30* (2006.01)

(52) U.S. Cl.
  CPC .............. *B64C 27/473* (2013.01); *F01D 5/14* (2013.01); *F01D 5/30* (2013.01); *F05D 2220/90* (2013.01); *F05D 2240/307* (2013.01)

(56) References Cited

U.S. PATENT DOCUMENTS

| | | | |
|---|---|---|---|
| 3,588,273 A | | 6/1971 | Kizilos |
| 3,592,559 A | | 7/1971 | Ward |
| 5,253,979 A | | 10/1993 | Fradenburgh et al. |
| 5,620,303 A | | 4/1997 | Moffitt et al. |
| 7,252,479 B2 * | | 8/2007 | Bagai ...................... B64C 27/10 |
| | | | 416/223 R |
| 10,899,440 B2 * | | 1/2021 | Sargent ................. B64C 27/463 |
| 2002/0098087 A1 | | 7/2002 | Gmirya |
| 2012/0070288 A1 | | 3/2012 | Höfinger |
| 2012/0305699 A1 | | 12/2012 | Cole |
| 2017/0036758 A1 | | 2/2017 | Nussenblatt et al. |
| 2018/0222579 A1 * | | 8/2018 | Simon ................... B64C 27/473 |

FOREIGN PATENT DOCUMENTS

| | | |
|---|---|---|
| JP | 7-507256 A | 8/1995 |
| JP | 2000-501676 A | 2/2000 |
| JP | 5078883 B2 | 9/2012 |

OTHER PUBLICATIONS

Supplementary European Search Report dated Dec. 10, 2020 in European Application No. 18791962.6.
Office Action dated Mar. 30, 2021 in Japanese Application No. 2017-086872, along with its English translation.

* cited by examiner

MAIN ROTOR BLADE AND HELICOPTER

CROSS-REFERENCE TO RELATED APPLICATIONS

This application is the U.S. national stage application of International Patent Application No. PCT/JP2018/004264, filed Feb. 7, 2018, which claims the benefit under 35 U.S.C. § 119 of Japanese Application No. 2017-086872, filed Apr. 26, 2017, the disclosures of each of which are incorporated herein by reference in their entirety.

TECHNICAL FIELD

The present invention relates to a main rotor blade used for a high-velocity helicopter such as an ambulance helicopter, for example. The present invention further relates to a helicopter including the main rotor blade.

BACKGROUND ART

It is known that the lifesaving rate of patients treated within 15 minutes after traffic collisions is high. However, in Japan for example, the current ambulance helicopters can only cover about 60% of the land within 15 minutes. Meanwhile, if the cruising velocity of ambulance helicopters is increased twice as fast as the current cruising velocity (for example, increased from about 250 km/h to about 500 km/h), about 90% of the land can be covered, which is very valuable.

Patent Literature 1 discloses an art of a shape of a main rotor blade used for such a high-velocity helicopter (250 kts=about 463 km/h). Patent Literature 1 discloses a main rotor blade used for a coaxial contra-rotating compound helicopter. It is necessary to increase the thickness of the blade root part to reduce flapping during high-velocity flight. So a drag force is increased during high-velocity flight, and the thrust efficiency is low. So a conventional flat-plate-like thin main rotor blade is used for a main blade type high-velocity helicopter. Here, according to the coaxial contra-rotating system, upper and lower main rotor blades are provided coaxially, the upper main rotor blades are rotated in one direction and the lower main rotor blades are rotated in the opposite direction, and an anti torque is thereby balanced. Further, a main blade type high-velocity helicopter has propellers at the both sides of a main blade, and an anti torque of the main rotor blade is thereby generated.

CITATION LIST

Patent Literature

U.S. Pat. No. 7,252,479

DISCLOSURE OF INVENTION

Technical Problem

However, use of a conventional flat-plate-like thin main rotor blade for a main blade type high-velocity helicopter will increase a drag coefficient during high-velocity forward flight and, in addition, will increase difficulty of control, which are problems.

In view of the aforementioned circumstances, it is an object of the present invention to provide a main rotor blade for a helicopter such as a main blade type helicopter, which may reduce a drag coefficient during high-velocity forward flight and which provides easy control. It is an object of the present invention to provide a helicopter including such a main rotor blade.

Solution to Problem

To attain the aforementioned object, a main rotor blade according to an embodiment of the present invention is a main rotor blade for a high-velocity helicopter including: a blade root part having a length of 30% or more of a rotor radius; and a blade main body continuous with the blade root part.

Here, the blade cross-sectional shape of the blade root part is different from a blade cross-sectional shape of a normal blade type. Typically, the leading edge and the trailing edge have round shapes.

Here, during the high forward thrust rate of a helicopter, a region called back flow region is enlarged at a backward drag side of a main rotor blade. Increase of a collective pitch angle to cope with the enlarged back flow region will reduce a thrust force, to the contrary. The back flow region is a region in which the mainstream flows from a trailing edge side to a leading edge side of a main rotor blade. The larger the back flow region, the larger the drag coefficient during high-velocity forward flight and the more difficult the control, in addition. The large back flow region will increase difficulty of control because of the following reason. Since a mainstream flows from a trailing edge of a blade in a back flow region, a negative lift force is generated, whereas a positive lift force is generated normally.

According to the present invention, a blade root part has a length of 30% or more of a rotor radius. As a result, the range of a blade having a blade shape in a back flow region is small. As a result, it is possible to reduce a drag coefficient during high-velocity forward flight and to provide easy control for a helicopter such as a main blade type helicopter.

Note that, if a blade root part has a length larger than 60% of a rotor radius, the figure of merit during hovering flight is largely reduced, and the practicality as a main rotor blade for a helicopter is lost.

According to a main rotor blade of an embodiment of the present invention, preferably, a cross-sectional shape of the blade root part satisfies $(x/a)^m + (y/b)^m = 1$ and $a > b$ where
m: arbitrary number,
x: chord length direction, and
y: blade thickness direction. Variation of m may lead to variation of the roundness and thickness of a leading edge and a trailing edge of an airfoil of a blade root part. In addition, it is possible to reduce the drag force of a blade root part with a less design parameter.

According to the present invention, the blade root part is thin in the blade thickness direction and, in addition, the entire body has a smooth shape. This shape may reduce the drag coefficient during high-velocity forward flight.

According to a main rotor blade of an embodiment of the present invention, preferably, a chord length of the blade main body has a maximum value at a position in a range of 50% to 90% of a rotor radius, and the maximum value is 1.6 times to 1.8 times as long as a reference chord length of an interface part between the blade root part and the blade main body.

Thanks to the aforementioned structure, the hovering performance (figure of merit) of the main rotor blade is similar to or is higher than the hovering performance (figure of merit) of a normal helicopter. At the same time, it is possible to reduce the drag coefficient during high-velocity forward flight.

According to a main rotor blade of an embodiment of the present invention, preferably, a torsion angle of the blade main body has a minimum value at a position in a range of 80% to 95% of a rotor radius, and is gradually reduced from a blade root side and from a blade tip side to the position.

Thanks to the aforementioned structure, the hovering performance (figure of merit) of the main rotor blade is higher than the hovering performance (figure of merit) of a normal helicopter. At the same time, it is possible to reduce the drag coefficient during high-velocity forward flight.

According to a main rotor blade of an embodiment of the present invention, preferably, a blade tip of the blade main body has a hedral angle of −30° to 30°.

If a hedral angle is provided in order to increase a hovering performance, the drag coefficient during high-velocity forward flight may be increased. However, the blade tip of the blade main body having a hedral angle (anhedral angle or dihedral angle) of −30° to 30° may prevent inhibit extreme increase of the drag coefficient, and may increase the hovering performance.

According to a main rotor blade of an embodiment of the present invention, preferably, a chord length of a blade tip of the blade main body is 30% or less of a reference chord length of an interface part between the blade root part and the blade main body.

At a forward thrust side of a main rotor blade, a larger Mach number generates shock waves and high-velocity shock sounds as a result, which are problems. However, the blade tip of the blade main body having a chord length of 30% or less of a reference chord length may reduce generation of shock waves on the blade tip during high-velocity forward flight.

According to a main rotor blade of an embodiment of the present invention, preferably, a blade tip of the blade main body has a swept-back angle of 60° or less.

The blade tip of the blade main body having a swept-back angle of 60° or less may reduce generation of a shock wave at the blade tip during high-velocity forward flight, similar to the above.

According to an embodiment of the present invention, a helicopter includes: the main rotor blade having the aforementioned structure.

Advantageous Effects of Invention

According to the present invention, it is possible to reduce a drag coefficient during high-velocity forward flight and provide easy control for a helicopter such as a main blade type helicopter.

MODE(S) FOR CARRYING OUT THE INVENTION

Hereinafter, an embodiment of the present invention will be described with reference to the drawings.

Figure 1:
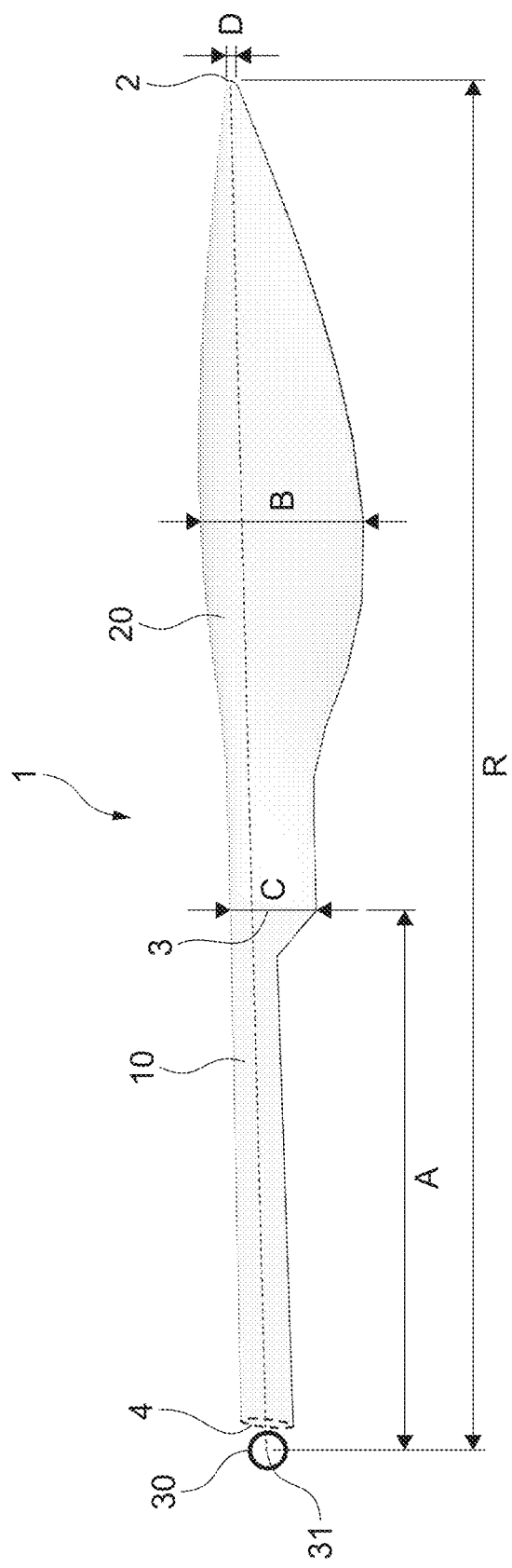
FIG. 1 A perspective view showing a structure of a main rotor blade according to an embodiment of the present invention.

FIG. 1 is a perspective view showing a structure of a main rotor blade according to an embodiment of the present invention.

As shown in FIG. 1, the main rotor blade 1 includes the blade root part 10 and the blade main body 20. Note that, here, it is supposed that the main rotor blade 1 is used for a helicopter with supposed flight conditions of hovering and high-velocity flight of the forward thrust rate of 0.8.

The main rotor blade 1 is used for a main blade type helicopter.

The blade root part 10 is a part of the main rotor blade 1, which is at a blade root side, does not have a blade-shaped cross-sectional shape, and mainly plays a role of an architecture without generating a lift force.

The length A of the blade root part 10 is 30% to 60% of the rotor radius R, and is more preferably 40% of the rotor radius R. The rotor radius R is a length from the center of rotation 31 of the rotor 30 of a helicopter to the blade tip 2 of the main rotor blade 1.

The blade main body 20 is structured continuous with the blade root part 10, and is a part of the main rotor blade 1 of a helicopter, which has a blade-shaped cross-sectional shape and generates a lift force.

Figure 2:
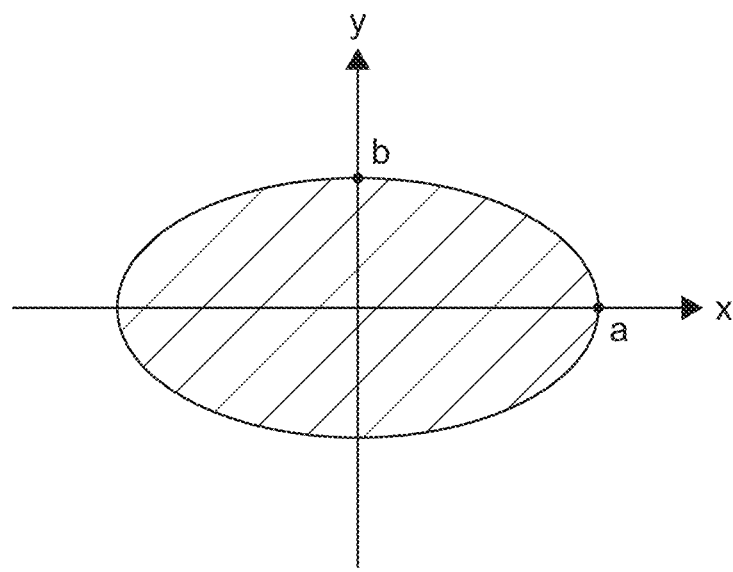
FIG. 2 A diagram showing a cross-sectional shape of the blade root part of FIG. 1.

FIG. 2 shows a cross-sectional shape of the blade root part 10.

As shown in FIG. 2, the cross-sectional shape of the blade root part 10 satisfies $$(x/a)^m + (y/b)^m = 1$$

and $$a > b$$

where
m: arbitrary number,
x: chord length direction, and
y: blade thickness direction.

Figure 3:
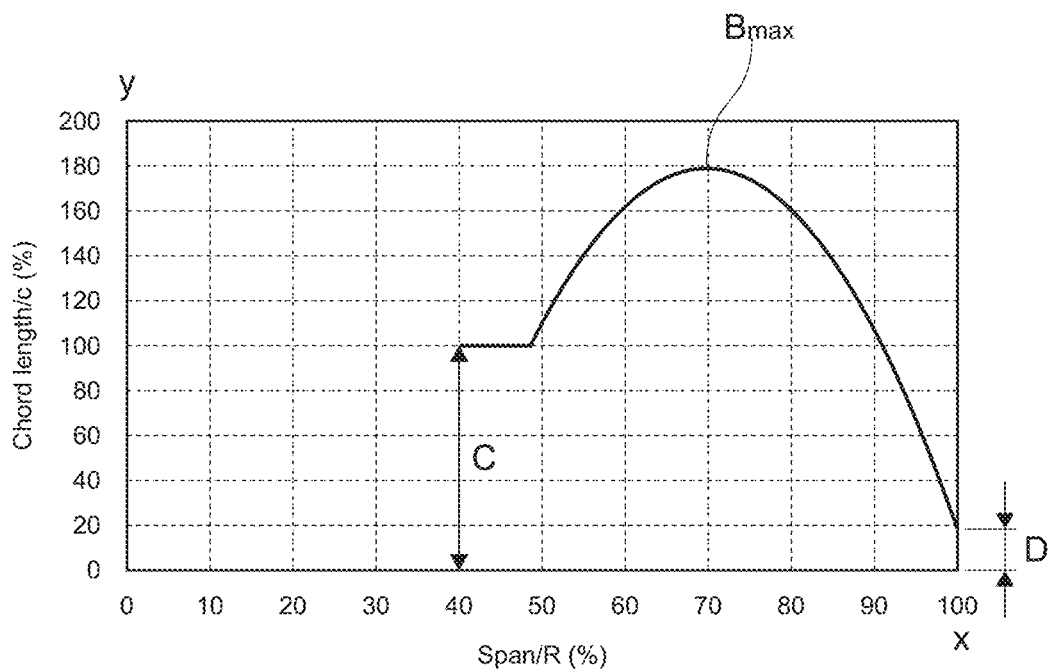
FIG. 3 A graph showing a chord length of the blade main body of FIG. 1.

FIG. 3 is a graph showing a chord length of the blade main body 20.

As shown in FIG. 3, the chord length B of the blade main body 20 has the maximum value Bmax at a position in a range of 50% to 90% of the rotor radius R. The maximum value is 1.6 times to 2.0 times and more preferably 1.8 times as long as the reference chord length C of the interface part (root cut out part) 3 between the blade root part 10 and the blade main body 20.

As shown in FIG. 3, the chord length B of the blade main body 20 is once increased as the chord comes closer to the blade tip 2, and the chord length B of the part at the blade tip 2 is extremely short. Typically, the chord length D of the blade tip 2 of the blade main body 20 is 30% or less of and more preferably 20% of the reference chord length C of the interface part 3. This structure may reduce generation of shock waves on the blade tip during high-velocity forward flight. The reason is as follows. The short chord length of the blade tip will inhibit increase of shock waves on the blade and will narrow a supersonic velocity region on the blade at the blade forward thrust side having the highest Mach number.

Figure 4:
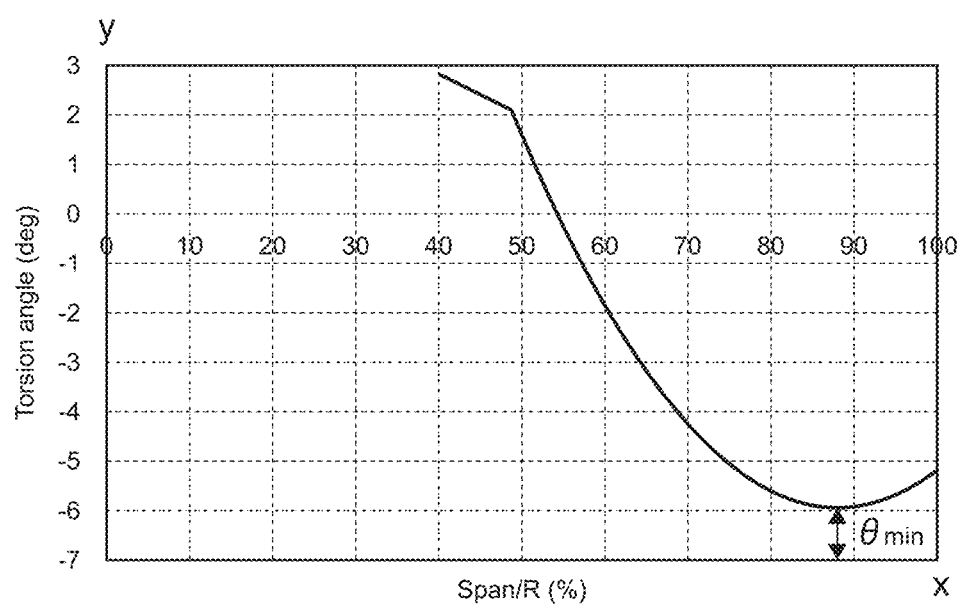
FIG. 4 A graph showing a torsion angle of the blade main body of FIG. 1.

The torsion angle θ of the blade main body 20 has a minimum value at a position in a range of 80% to 95% of the rotor radius R, and is gradually reduced from the side of the blade root 4 and from the blade tip 2 to the position of the minimum value. As shown in FIG. 4, for example, the torsion angle θ of the blade main body 20 at a position slightly deviated from the blade tip 2 to the side of the blade root 4 (for example, position of about 90% of the rotor radius R) once has the minimum value $θ_{min}$, and the torsion angle θ of the blade tip 2 is slightly larger than that. Here, the torsion angle of the main rotor blade 1 is the angle of the blade airfoil at each span position from the blade root part to the blade tip part of the blade. The streamwise velocity of the blade airfoil differs depending on the span position from the blade root part to the blade tip part of a helicopter. In view of that fact, provision of the torsion angle in the span direction will generate a lift force at each span position with an appropriate angle of attack.

In the distribution shown in each of FIG. 3 and FIG. 4, three points on the span of the main rotor blade 1 are interpolated by a cubic spline function.

Specifically, the chord length distribution of FIG. 3 satisfies, where x is a variable that represents the position of the rotor radius R, $$y=-8e-10x^3-0.2393x^2+1.839x-2.7984$$

The torsion angle distribution of FIG. 4 satisfies $$y=2e-8x^3+1.7125x^2-16.601x+34.299$$

To express the chord length B and the torsion angle θ on the span of the main rotor blade 1 by using polynomials allows to select one of a case where adjacent segments are continuous via the junction point therebetween, or a case where adjacent segments are not continuous via the junction point therebetween. In other words, where the adjacent segments are continuous, a polynomial derivative (n−1)th formula may be used. Where the adjacent segments are not continuous, a formula other than that may be used.

Similarly, to express the below-mentioned swept-back angle and anhedral angle (or dihedral angle) by using polynomials allows to select one of a case where adjacent segments are continuous via the junction point therebetween, or a case where adjacent segments are not continuous via the junction point therebetween.

Figure 5:
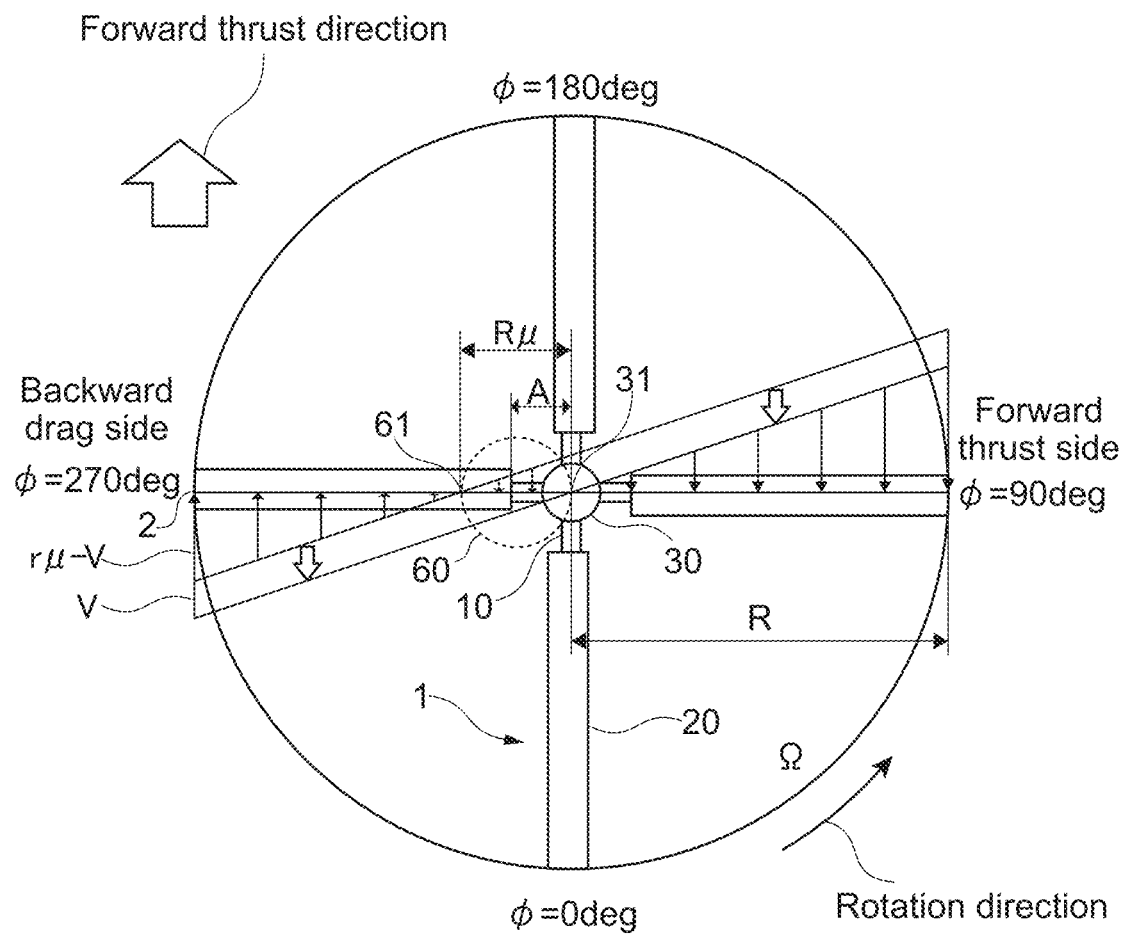
FIG. 5 A diagram illustrating a fact that a back flow region is generated at the backward drag side of the main rotor blade.

FIG. 5 is a diagram illustrating a fact that a back flow region is generated at the backward drag side of the main rotor blade 1. FIG. 5 is a top view of the main rotor blade 1, which is rotating. The main rotor blade 1 rotates in the anticlockwise direction in FIG. 5, and the forward thrust direction of the helicopter is the upward direction of FIG. 5.

When the main rotor blade 1 is positioned at the backward drag side, the horizontal flight velocity (V) balances the rotation velocity (rΩ) in the rotor radius direction r. For example, when the main rotor blade 1 is at the position of Φ=270°, the direction of the horizontal flight velocity (V) is totally opposite to the direction of the rotation velocity (rΩ) in the rotor radius direction r. Here, the closer to the center of rotation 31 of the rotor 30, the smaller the rotation velocity (rΩ). As a result, at the predetermined position 61 of the main rotor blade 1, the relationship between the horizontal flight velocity (V) and the rotation velocity (rΩ) is inverted such that the horizontal flight velocity (V)>the rotation velocity (rΩ) is satisfied. In other words, the mainstream flow direction is changed such that the mainstream flows from the trailing edge side to the leading edge side of the main rotor blade 1. The back flow region 60 may be generated from the position 61 to the center of rotation 31 of the rotor 30. Especially, the closer to the center of rotation 31 of the rotor 30, the larger the effect of a reverse thrust force due to the horizontal flight velocity (V). In addition, the higher the velocity, the larger the effect of the reverse thrust force due to the horizontal flight velocity (V). In the main rotor blade 1, the length A of the blade root part 10, which is not affected by the reverse thrust force due to the horizontal flight velocity (V), is long. As a result, the back flow region 60 is not generated in a part close to the blade root 4. As a result, the drag coefficient during high-velocity forward flight can be reduced. Further, also, control is not difficult because a negative lift force is not likely to be generated in the back flow region.

Here, the distance between the position 61, at which the back flow region 60 starts, and the center of rotation 31 of the rotor 30 is Rμ. (R: rotor radius, μ: forward thrust rate). Preferably, the length A of the blade root part 10 of the main rotor blade 1 is ½ of Rμ. As a result, the figure of merit of the main rotor blade 1 is not reduced and, at the same time, the effect of the back flow region 60 may be minimized.

The forward thrust rate μ is a ratio obtained by dividing the horizontal flight velocity (V) by the blade tip velocity (RΩ (R: rotor radius, Ω: rotation velocity)) of the rotor 30, and satisfies $$μ=V/RΩ$$

Further, the chord length B of the blade main body 20 of the main rotor blade 1 has the maximum value Bmax at a position in a range of 50% to 90% of the rotor radius R. The maximum value Bmax is 1.6 times to 2.0 times as long as the reference chord length C. In addition, the torsion angle θ of the blade main body 20 at a position slightly deviated from the blade tip 2 to the side of the blade root 4 once has the minimum value $θ_{min}$, and the torsion angle θ of the blade tip 2 is slightly larger than that. As a result, the figure of merit of the main rotor blade 1 is not reduced and, at the same time, the drag coefficient may be reduced. The figure of merit of the main rotor blade 1 having the blade main body 20 of such a shape is higher than the figure of merit of a conventional flat-plate-like main rotor blade (constant chord length and constant torsion angle). At the same time, the drag coefficient of the main rotor blade 1 having the blade main body 20 of such a shape is lower by about 15% than the drag coefficient of a conventional flat-plate-like main rotor blade (constant chord length and constant torsion angle).

Further, the blade root part 10 of the main rotor blade 1 having the cross-sectional shape shown in FIG. 2 reduces the drag coefficient.

An embodiment of the present invention has been described above. However, the present invention is not limited to the aforementioned embodiment. As a matter of course, various modifications may occur.

Figure 6:
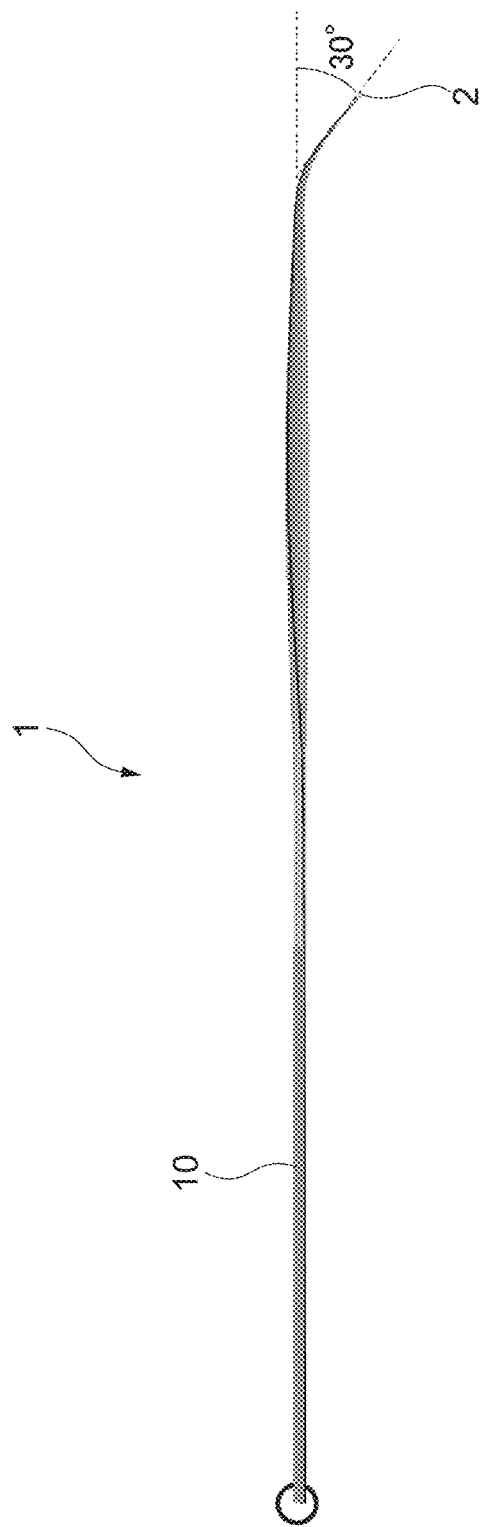
FIG. 6 A side view showing a structure of a main rotor blade according to a modification example of the present invention.

For example, as shown in FIG. 6, the blade tip 2 of the blade main body 20 may have an anhedral angle or a dihedral angle. In this example, the blade tip 2 of the blade main body 20 has the anhedral angle of 30°. Preferably, the range of a hedral angle is −30° to 30°. This range may increase the figure of merit during hovering. The reason is as follows. The distance between the blade tip and the blade main body is increased. As a result, a phenomenon, in which a blade tip vortex suddenly changes the lift force distribution on the blade, may be reduced. As a result, the induced velocity distribution on the rotor plane has an almost constant value.

Figure 7:
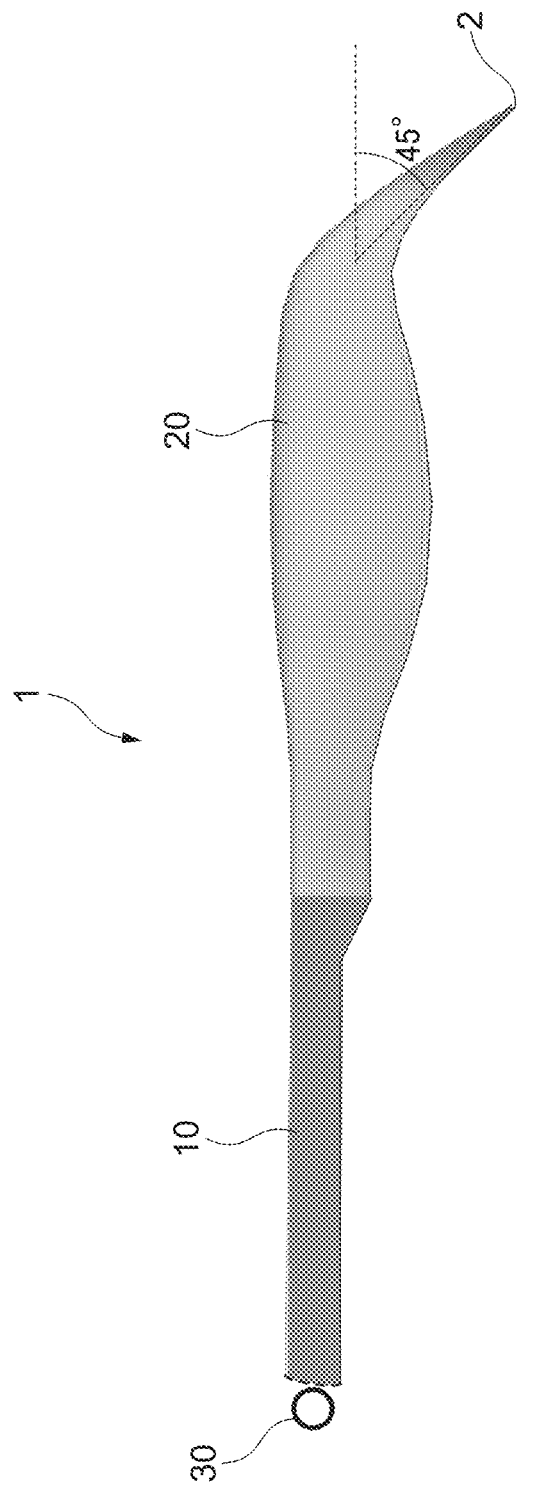
FIG. 7 A top view showing a structure of a main rotor blade according to another modification example of the present invention.

Further, as shown in FIG. 7, the blade tip 2 of the blade main body 20 may have a swept-back angle. In this example, the blade tip 2 of the blade main body 20 has a swept-back angle of 45°. Preferably, the range of the swept-back angle is 60° or less. This range of the swept-back angle may inhibit the drag coefficient from being increased. The reason is as follows. The mainstream component with respect to the blade is reduced. As a result, it is possible to inhibit a drag force due to a shock wave from being increased. The blade tip of the blade main body having the swept-back blade may have an anhedral angle of FIG. 6 or a dihedral angle.

Further, according to the aforementioned embodiment, the main rotor blade 1 is used for a main blade type helicopter. However, the main rotor blade of the present invention may be applicable for other types of helicopter. Further, according to the aforementioned embodiment, it is supposed that the main rotor blade 1 is used for a helicopter with supposed flight conditions of hovering and high-velocity flight of the forward thrust rate of 0.8. However, the forward thrust rate may be 0.8 or less, or 0.8 or more.

REFERENCE SIGNS LIST 1 main rotor blade
10 blade root part
20 blade main body
30 rotor
R rotor radius

The invention claimed is:

1. A main rotor blade, comprising:
a blade root part having a length of 30% or more of a rotor radius; and
a blade main body continuous with the blade root part,
wherein a chord length of the blade main body has a maximum value at a position in a range of 50% to 90% of the rotor radius, and the maximum value is 1.6 times to 1.8 times as long as a reference chord length of an interface part between the blade root part and the blade main body.

2. The main rotor blade according to claim 1,
wherein a cross-sectional shape of the blade root part satisfies $(x/a)^m + (y/b)^m = 1$ and $a > b$ where
m: arbitrary number,
x: chord length direction, and
y: blade thickness direction.

3. The main rotor blade according to claim 1, wherein
a torsion angle of the blade main body has a minimum value at a position in a range of 80% to 95% of the rotor radius, and is reduced from a blade root side and from a blade tip side to the position.

4. The main rotor blade according to claim 1, wherein
a blade tip of the blade main body has a hedral angle of −30° to 30°.

5. The main rotor blade according to claim 1, wherein a chord length of a blade tip of the blade main body is 30% or less of the reference chord length of the interface part between the blade root part and the blade main body.

6. The main rotor blade according to claim 1, wherein
a blade tip of the blade main body has a swept-back angle of 60° or less.

7. A helicopter, comprising:
a main rotor blade including
a blade root part having a length of 30% or more of a rotor radius, and
a blade main body continuous with the blade root part,
wherein a chord length of the blade main body of the main rotor blade has a maximum value at a position in a range of 50% to 90% of the rotor radius, and the maximum value is 1.6 times to 1.8 times as long as a reference chord length of an interface part between the blade root part and the blade main body.

8. The helicopter according to claim 7,
wherein a cross-sectional shape of the blade root part of the main rotor blade satisfies $(x/a)^m + (y/b)^m = 1$ and $a > b$ where
m: arbitrary number,
x: chord length direction, and
y: blade thickness direction.

9. The helicopter according to claim 7, wherein
a torsion angle of the blade main body of the main rotor blade has a minimum value at a position in a range of 80% to 95% of the rotor radius, and is reduced from a blade root side and from a blade tip side to the position.

10. The helicopter according to claim 7, wherein
a blade tip of the blade main body of the main rotor blade has a hedral angle of −30° to 30°.

11. The helicopter according to claim 7, wherein a chord length of a blade tip of the blade main body of the main rotor blade is 30% or less of the reference chord length of the interface part between the blade root part and the blade main body.

12. The helicopter according to claim 7, wherein
a blade tip of the blade main body of the main rotor blade has a swept-back angle of 60° or less.

* * * * *